United States Patent [19]

Martin

[11] Patent Number: 4,890,559
[45] Date of Patent: Jan. 2, 1990

[54] STEERING WHEEL TABLE

[76] Inventor: Gail E. Martin, 204 Yale St., Nampa, Id. 83651

[21] Appl. No.: 297,343

[22] Filed: Jan. 17, 1989

[51] Int. Cl.$^4$ ............................................. A47B 23/00
[52] U.S. Cl. ................................................... 108/44
[58] Field of Search ....................... 108/43, 44, 45, 46; 312/231, 233; 248/449, 441.1

[56] References Cited

U.S. PATENT DOCUMENTS

| | | | |
|---|---|---|---|
| 2,746,821 | 5/1956 | Schroeder | 108/44 |
| 2,863,256 | 12/1958 | Hegarty | 248/444 |
| 2,866,381 | 12/1958 | Alldredge | 108/44 X |
| 3,643,606 | 2/1972 | Vise | 108/44 |
| 4,453,788 | 6/1984 | Russell | 312/231 |
| 4,619,386 | 10/1986 | Richardson | 108/44 X |

FOREIGN PATENT DOCUMENTS 2025003 12/1971 Fed. Rep. of Germany ........ 108/44

Primary Examiner—Peter A. Aschenbrenner
Attorney, Agent, or Firm—Paul F. Horton

[57] ABSTRACT

A table device mountable upon a steering wheel, said device including a box-like structure provided with a bottom opening for placement over and reception of a steering wheel; a table pivotally engaging the box-like structure; a pair of laterally disposed support legs pivotally engaging the table; and a latch for holding the table at a selected angle relative to the box-like structure and hence the steering wheel. The device folds into a compact unit for storage.

13 Claims, 1 Drawing Sheet

STEERING WHEEL TABLE

BACKGROUND OF THE INVENTION

1. Field of the Invention

This invention relates, generally, to tables and, more particularly, to a table mountable upon a steering wheel.

2. Description of the Prior Art

The steering wheel of recreational vehicles, ie. RV's, when the RV is parked and serving as a home, is considered an eye sore and takes up space which might otherwise be useable in the home. There is therefore a need to keep the steering wheel out of sight while, at the same time, utilizing the space taken by the steering wheel. While not specifically addressing the problem of covering the steering wheel for aesthetic reasons, several inventions have provided desks and tables which are attachable to the steering wheel as typified by U.S. Pat. No. 2,244,861 issued to S.K. Walker; U.S. Pat. No. 2,746,821 issued to F. M. Schroeder; U.S. Pat. No. 2,866,381 issued to E. Alldredge; U.S. Pat. No. 3,643,606 issued to M. Vise; U.S. Pat. No. 3,952,988 issued to H.D. Easterly; and U.S. Pat. No. 4,749,161 issued to G. Falcone.

When utilizing the space as a table, it is highly desirable that the table be readily placed, removed, and stored; be useable with steering wheels of varying sizes and constructions; be held at a sufficient height, preferably at the top of the steering wheel; be tiltable for writing, painting, and the like; be stable; and be pleasing to the eye. The Alldredge invention is fastened to the steering wheel by a pair of laterally spaced hooks and an adjustable arm engaging the bottom of the wheel for tilting of the table. The Alldredge device does not cover the steering wheel; is inherently unstable the slipping of the hooks on the steering wheel for tilting; and has a height which must be below the top of the wheel and which varies with the diameter of the wheel. The Easterly and Falcone devices solidly engage the wheel, but cannot be tilted to and from horizontal.

SUMMARY OF THE INVENTION

The present invention comprises, generally, a table device for mounting upon a steering wheel which includes a box-like structure defining a bottom opening for ready placement upon and removal from steering wheels of varying sizes and construction and which hides the steering wheel; which includes a table which is pivotal with and relative to the box-like structure for tilting from horizontal to any selected position and which, at horizontal, has a height which is always substantially even with the top of the steering wheel; which includes a pair of laterally spaced legs held in position by a pin latch for increased stability; and in which all parts fold neatly within the table for convenient storage.

Additional objects and advantages will become apparent and a more thorough and comprehensive understanding may be had from the following description taken in conjunction with the accompanying drawings forming a part of this specification.

BRIEF OF THE DRAWINGS

Figure 3:
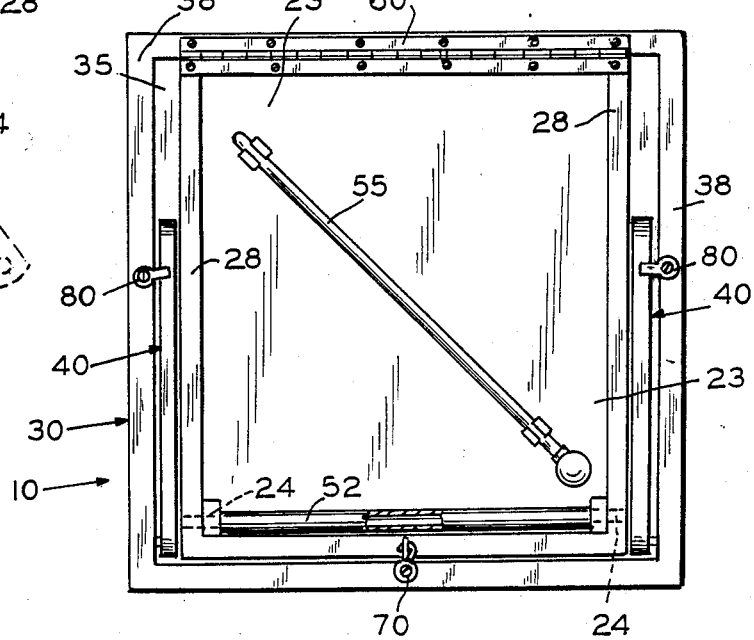

FIG. 3 a bottom view of the device, shown in the storage mode.

DETAILED DESCRIPTION OF THE INVENTION

Referring now to the drawings, an embodiment to be preferred of a table device 10, made according to the present invention, for mounting upon a steering wheel 5 is disclosed. Table device 10 includes steering wheel engagement means, designated generally by the numeral 20; a table 30; support legs 40; and latch means, designated generally by the numeral 50. All structural members, other than hardware, are preferably constructed of wood.

Steering wheel engagement means 20 preferably includes a rectangular, box-like member having a top panel 22 and downwardly depending side members 28 to define a bottom opening 25. The top panel has planar opposing surfaces; top surface 21 and bottom surface 23. When in place over steering wheel 5, the top surface of the wheel is engaged by the bottom surface of the panel and the outer periphery of the wheel is engaged, at points, by the interior surfaces of the side members. As shown in FIG. 3, adjacent the bottom end of member 20, opposing side members are provided with aligned apertures 24, the use of which will hereinafter be explained.

Table 30 is similar in construction to the steering wheel engagement member, being rectangular and box-like in construction, having a platform 32 provided with downwardly depending side members 38 to define a bottom opening 35. The table is of slightly larger dimensions than member 20 so that member 20 may be received within opening 35 for storage. Platform 32 is provided with an upper planar surface defining the table top and an opposing planar under surface, not shown.

Shown to advantage in FIG. 3, mounted to the bottom edge of the rearmost side members 28 and 38, respectively, of both the steering wheel engagement member 20 and table 30, is a piano type hinge 60 for pivotally connecting the table to member 20.

In the preferred embodiment, two laterally spaced leg members 40 are provided; each of the leg members pivotally engaging opposing side members 38 of table 30 by suitable pivot members 43, shown in the form of a pin or bolt. Each of the legs are parallel to and spaced inwardly of the side members to which they are fastened so that they may be folded within the table for storage, as also shown to advantage in FIG. 3. Along the length of legs 40 are a plurality of spaced apertures 44, each of the apertures being aligned with and in registry with respective apertures of the other leg. Respective apertures of each leg are also brought into registry with apertures 24 of steering wheel engagement member 20 so that latch means 50, in the form of a latch pin 55, may be inserted through one of the apertures 44 of a first leg member 40; through one of the apertures 24 of the steering wheel engagement member 20; through the opposing aperture 24 of member 20; and through the opposing aperture 44 of the second leg member 40 to secure table 30 at a selected angle relative to steering wheel engagement member 20 and hence steering wheel 5. To aid in the insertion of pin 55, a guide tube 52, extending along the back surface 23 of member 20 between opposing side members 28, and in alignment with opposing apertures 24 of member 20, may be provided.

Figure 1:
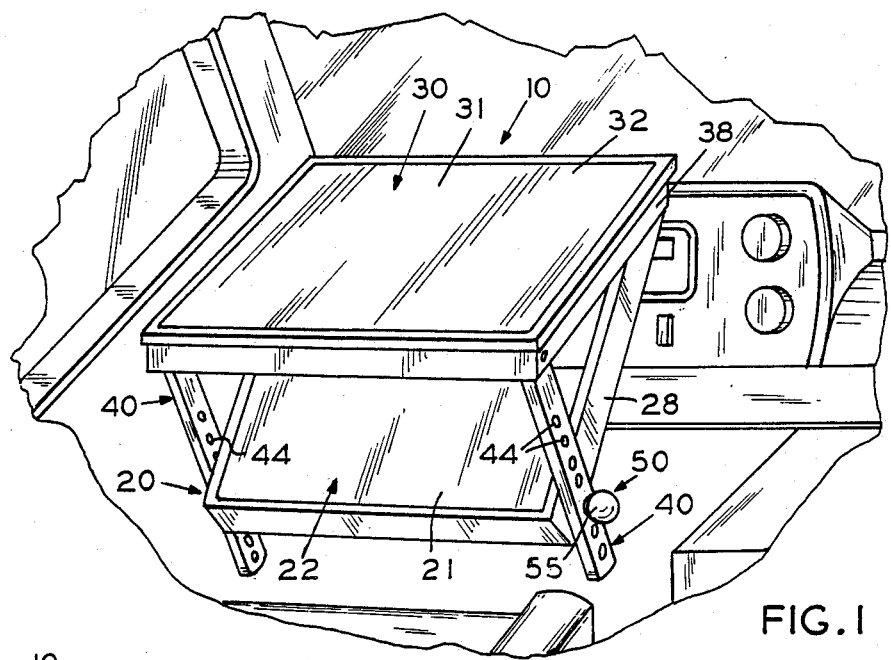
FIG. 1 is a perspective view of a preferred embodiment of the invention shown mounted upon a steering wheel.
Figure 2:
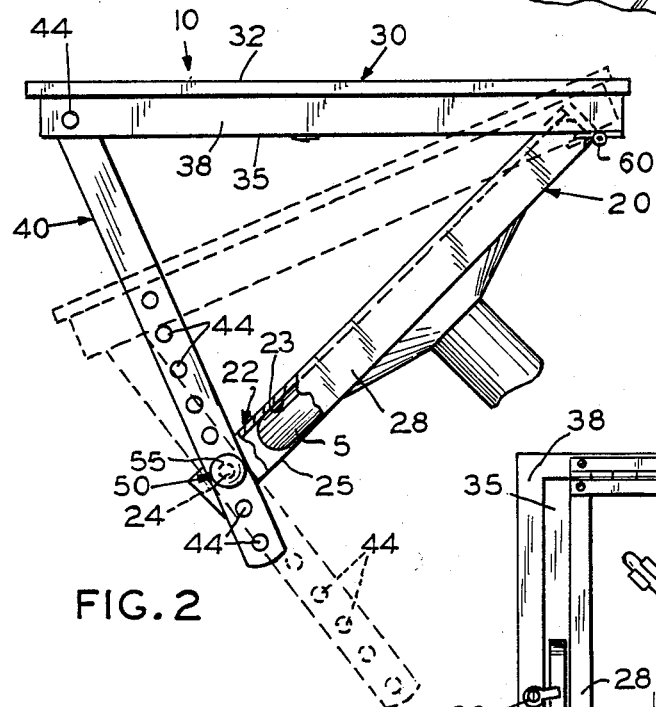
FIG. 2 is a side elevation of the device of FIG. 1, showing a change in position by broken lines.

For placement of device 10 upon the steering wheel 5, bottom opening 25 of the steering wheel engagement member 20 is simply fitted over the steering wheel with the upper surface of the steering wheel contacting the bottom surface 23 of member 20. Should it be desired that the table top 31 be horizontal, as shown in FIG. 2, for placement of a television, flower bowl, or the like, the table is simply leveled and pin 55 inserted through appropriate apertures 44 of the support legs 40, as above described. It will be noted that the level of the table is substantially even with the top of the covered steering wheel. In the same manner, the table may be tilted to a selected angle for drawing, painting, or the like, and again pin 55 inserted through appropriate apertures, as shown by the broken lines in FIG. 2. It is also to be noted that no further connections need be made with the steering wheel in the pivoting of the table.

For storage, device 10 is simply lifted of the steering wheel; steering wheel engagement member 20 is pivoted to a position within bottom opening 35 of table 30 by mean of hinge 60; and legs 40 are also pivoted within bottom opening 35 of the table by means of pivot member 43 so that the entire structure is folded to the dimensions of table 30. A first fastener 70, shown in the form of a hook and eye assembly in FIG. 3, may be used to hold the steering wheel engagement member within the table for storage and a pair of second fasteners 80, shown in the form of a rotatable clasp, may be used to hold legs 40 within the table.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A steering wheel table device for mounting upon a steering wheel, said device comprising:
   steering wheel engagement means including a box-like structure having a top panel and side members downwardly depending therefrom to define a bottom opening for placement over and receiving the steering wheel;
   a table pivotally engaging said engagement means;
   at least one support leg pivotally engaging said table; and
   latch means for latching said support leg to said wheel engagement means to hold said table at a selected angle relative to said steering wheel engagement means.

2. The device as described in claim 1 wherein said steering wheel engagement structure is rectangular in configuration.

3. The device as described in claim 1 wherein said table includes a platform having substantially planar opposing surfaces and downwardly depending side members about the periphery of the platform to define a bottom opening for pivotally receiving said steering wheel engagement means and each of said support legs for storage.

4. The device as described in claim 3 further comprising a first fastener for securing said steering wheel engagement means within said table for storage.

5. The device as described in claim 4 including two laterally spaced support legs; each support leg pivotally receivable within said table for storage.

6. The device as described in claim 5 wherein each of said legs is provided with a plurality of apertures spaced along the length of each leg; respective apertures of each leg in registry with one another; and wherein said steering wheel engagement means is provided with apertures registerable with the apertures of each leg; and wherein said latch means includes a pin receivable within apertures in registry for holding said table in a fixed position relative to said steering wheel engagement means.

7. The device as described in claim 6 wherein said latch means includes a pin tube located between opposing apertures of said steering wheel engagement means for guidance of said pin.

8. A steering wheel table device for mounting upon a steering wheel, said device comprising:
   steering wheel engagement means including a box-like structure having a top panel and downwardly depending side members to define a bottom opening for placement over and for receiving the steering wheel;
   a table at one end pivotally engaging said steering wheel engagement means, said table provided with a platform and with downwardly depending side members about the periphery thereof to define a bottom opening for receiving said steering wheel engagement means therein for storage;
   a pair of support legs, each of said support legs in pivotal engagement with said table and receivable within said bottom opening of said table for storage; and
   latch means for latching each of said support legs to said wheel engagement means to hold said table at a selected angle relative to said steering wheel engagement means.

9. The device as described in claim 8 wherein said steering wheel engagement means and said table are rectangular in configuration.

10. The device as described in claim 8 wherein said steering wheel engagement means includes a pair of oppositely disposed apertures in registry with one another; wherein each of said support legs are provided with a plurality of spaced apertures along the length thereof; respective apertures of opposing legs in registry with one another and with the apertures of said steering wheel engagement means; and wherein said latch means includes a pin receivable with apertures in registry for securing said table at a selected angle relative to said steering wheel engagement means.

11. The device as described in claim 10 wherein said latch means includes a pin tube located between opposing apertures of said steering wheel engagement means for guidance of said pin.

12. The device as described in claim 8 further comprising a first fastener for securing said steering wheel engagement means within said table for storage.

13. The device as described in claim 8 further comprising second fastening means for securing said support legs within said table for storage.

* * * * *